United States Patent [19]
Lybarger

[11] Patent Number: 5,584,173
[45] Date of Patent: Dec. 17, 1996

[54] NOZZLE SEAL ASSEMBLY WITH REMOVABLE BASEPLATE

[75] Inventor: Michael A. Lybarger, Ipswich, Mass.

[73] Assignee: General Electric Company, Cincinnati, Ohio

[21] Appl. No.: 334,070

[22] Filed: Sep. 1, 1994

Related U.S. Application Data

[63] Continuation of Ser. No. 43,096, Apr. 5, 1993, abandoned.

[51] Int. Cl.$^6$ ....................................................... F02C 7/20
[52] U.S. Cl. ........................ 60/39.31; 60/39.32; 60/271; 239/265.11; 239/DIG. 19
[58] Field of Search ................................ 60/39.31, 39.32, 60/271; 239/265.11, 265.19, DIG. 19

[56] References Cited

U.S. PATENT DOCUMENTS

| | | | |
|---|---|---|---|
| 2,910,828 | 11/1959 | Meyer et al. | 60/35.6 |
| 4,022,948 | 5/1977 | Smith et al. | 428/542 |
| 4,081,137 | 3/1978 | Sutton et al. | 239/127.3 |
| 4,128,208 | 12/1978 | Ryan et al. | |
| 4,171,093 | 10/1979 | Honeycutt, Jr. et al. | 239/127.3 |
| 4,544,098 | 10/1985 | Warburton | |
| 4,555,901 | 12/1985 | Wakeman et al. | 60/39.32 |
| 4,614,082 | 9/1986 | Sterman et al. | 60/39.32 |
| 4,944,151 | 7/1990 | Hovnanian | 60/39.32 |
| 4,994,660 | 2/1991 | Hauer | |
| 5,000,386 | 3/1991 | Lybarger | |
| 5,039,014 | 8/1991 | Lippmeier | |
| 5,067,324 | 11/1991 | Beytes et al. | 60/271 |
| 5,069,034 | 12/1991 | Jourdain et al. | |
| 5,076,496 | 12/1991 | Lippmeier | |
| 5,111,992 | 5/1992 | Barcza | |
| 5,232,158 | 8/1993 | Barcza | 239/265.35 |

FOREIGN PATENT DOCUMENTS

| | | |
|---|---|---|
| 711941 | 7/1954 | United Kingdom |
| 2151544 | 7/1985 | United Kingdom |
| WO9203649 | 3/1992 | WIPO |

Primary Examiner—Louis J. Casaregola
Assistant Examiner—William Wicker
Attorney, Agent, or Firm—Andrew C. Hess; David L. Narciso

[57] ABSTRACT

A thermal shield and support structure assembly for a gas turbine engine is disclosed wherein the thermal shield can be removed while the support structure is still mounted in the engine. The thermal shield in the form of a divergent seal baseplate and the support structure is particularly useful for divergent seals and provides a removable baseplate having at least two hooks disposed on the back side of the baseplate. The hooks have axially facing openings, preferably open in the forward facing direction and are operable to engage transversely extending pins on the frame of the support structure. An axial retaining means to prevent the hooks from disengaging from the pins may also be used which, in one embodiment, provides a lug having a first aperture and extending away from the back side of the baseplate to engage a clevis having two arms having second apertures alignable with the lug's aperture and a bolt or other fastening means disposed through the apertures.

11 Claims, 2 Drawing Sheets

NOZZLE SEAL ASSEMBLY WITH REMOVABLE BASEPLATE

This application is a continuation of application Ser. No. 08/043,096 filed Apr. 5, 1993, now abandoned.

BACKGROUND OF THE INVENTION

1. Field of the Invention

This invention relates to aircraft gas turbine engine nozzles and in particular to removable baseplates for the divergent seals in the nozzles.

2. Description of Related Art

A gas turbine engine produces a reaction thrust by ejecting a high velocity stream of gas from an exhaust nozzle. Air enters the engine and is compressed in a compressor section, fuel is added to the compressed air and at least a part of it is combusted in a combustor section, and the hot gas is then expanded in a turbine section. Part of the produced energy is extracted to drive the compressor section. Often, particularly in the case of military engines, the turbine effluent is mixed with additional fuel and combusted a second time in an afterburner before being expanded through an exhaust nozzle which converts the remaining available energy of the gas stream into a high velocity flow producing thrust for propulsion power. Thrust developed by the engine can range from a few hundred pounds to many thousand pounds.

A typical aircraft gas turbine engine uses a high pressure converging-diverging exhaust nozzle having alternating convergent nozzle flaps and seals mounted circumferentially around the exhaust section. This convergent section of nozzle is typically capable of adjustably reducing the cross-sectional area through which exhaust gas flows, forming a variable area nozzle throat at its aft end. Mounted immediately aft of the converging nozzle flaps in a similar manner and hinged thereto are corresponding divergent nozzle flaps and seals. One particular application for the present invention is an advanced axisymmetric vectoring nozzle (AVEN™ nozzle) wherein the convergent and divergent flaps are connected by a universal joint such as a ball joint to vector the nozzle's exhaust flow and thrust. Further reference may be had to U.S. Pat. No. 4,994,660, entitled "AXISYMMETRICAL VECTORING EXHAUST NOZZLE", by Hauer, assigned to the present assignee.

These divergent flaps increase the exit area through which the exhaust gases flow. At idle and cruise speeds, the nozzle configuration is set to maximize fuel efficiency. However, for take-off and acceleration during flight when maximum thrust is needed, the nozzle is adjusted accordingly to provide the converging-diverging gas flow passage. The dimensions of the throat and exit flow passage areas are varied to match the flow and expansion requirements of varying flight speeds and altitudes experienced on a routine basis by the aircraft.

The flaps and seals are generally rectangular in shape and are about three to six inches wide. The flaps are mounted so that they move about pivot points toward or away from a centerline extending the length of the engine. Each set of flaps spreads out in a fan-like manner during movement. The seals, which are similar in construction to the flaps, typically are positioned between adjacent nozzle flaps. The seals are mounted to move laterally relative to and between the flaps to form a generally continuous interior surface which directs gas flow in a desired manner. All the exhaust flaps are operably connected to various centering and retaining devices on the back sides of the flaps and seals to simultaneously move together in response to actuating devices used to control the nozzle's throat to exit area ratio and, in the case of the AVEN™ nozzle, to vector the nozzle's thrust.

One type of conventional nozzle flap or seal comprises an inseparable assembly of welded components. The generally rectangular-shaped bottom portion or front side of the flap or seal faces inwardly and, as such, is directly exposed to the hot exhaust gas of the engine, which may have a temperature of up to about 1200° C. The back side of the flap or seal is also subjected to high temperature, though considerably less, e.g. up to about 400° C. The extreme transient and steady state temperature cycles experienced by the flaps during use induce high thermal stresses in the bottom portion and ultimately cracking results. Exposure of the front side of the seal or flap to such high temperatures produces thermal stresses which warp and structurely degrade the front side, requiring that the nozzle seal or flap be periodically replaced. Replacement of the distressed hardware involves costly down time and replacement parts, since a complete flap or seal must be disconnected from its linkages and attachment points and a replacement installed.

One proposed solution to this problem is disclosed in U.S. Pat. No. 5,000,386, entitled "Exhaust Flaps", by the present inventor and assigned to the present assignee. An exhaust flap for mounting in a gas turbine engine comprises an elongated frame to which is removably mounted a baseplate, comprising a front side and a retainer means. The baseplate is dimensioned to slide into receiving, longitudinally extending channels or slots, attached to the frame, to substantially cover the bottom of the flap and form a solid bottom surface or front side. An axial retainer means attached to the frame securely holds the baseplate in position yet is readily removed to permit replacement of the baseplate by sliding it out of the channels of the frame. The maintenance time and cost involved in replacing a damaged flap is substantially reduced when the damage is limited to the baseplate. The baseplate of the flap is readily replaced with the exhaust flap installed in the engine merely by removal of the retainer means and removal and replacement of the damaged baseplate with a new baseplate. Complete disassembly of the total flap from the engine is avoided.

Another feature and advantage of the flap in U.S. Pat. No. 5,000,386 is that the frame allows the baseplate to float and isolates the thermal growth of the baseplate from the structural restraints of the main flap structure, often referred to as the backbone. However, such a design is not readily adaptable for use with seals. The high temperature exposure of the flap baseplate does not extend to the longitudinally extending edges of the flap baseplate, because it is shielded by the seals; whereas the seal edges are exposed. The transverse expansion between the longitudinally extending edges of the seal baseplate and the curling of the baseplate due to thermal growth would be constrained by the longitudinally extending channels or slots of the design in the prior art.

In accord with a demonstrated need for a seal design which has a thermally isolated or floating baseplate that is easily removed without requiring demounting of the total seal from the engine, there has been developed an exhaust seal assembly for use in aircraft gas turbine engine nozzles which improve upon that previously used. The seal assemblies have increased service life and reduced maintenance time when baseplate replacement is required.

SUMMARY OF THE INVENTION

A thermal shield and support structure assembly for a gas turbine engine is disclosed wherein the thermal shield can be removed while the support structure is still mounted in the engine. The embodiment of the present invention presented herein is a thermal shield in the form of a baseplate of a exhaust nozzle divergent seal but is also applicable to other thermal shields and shield supports such as an exhaust nozzle convergent flap or seal which have support structures that can remain mounted in the engine during baseplate replacement.

A more particular embodiment provides a removable baseplate and support structure assembly for use in flaps and seals in the exhaust nozzle of an aircraft gas turbine engine having increased service life and ease of replacement. The baseplate and support structure assembly of the present invention includes convergent and divergent flaps and seals. The baseplate and support structure assembly is particularly useful for divergent seals and provides a removable baseplate having at least one hook, and preferably two, disposed on the back side of the baseplate. The hooks have axially facing openings, preferably open in the forward facing direction. The hooks are operable to engage transversely extending surfaces on the frame of the support structure.

The support structure includes dampening or preloading means to compliantly load the baseplate in the radial direction with respect to the frame to suppress and dampen mechanical vibration and flutter. In one embodiment the baseplate is preferably constructed of sheet metal and the dampening means are in the form of transversely extending arms that are biased radially inward and operable to engage the back side of the baseplate in bending. The baseplate may also accommodate a thermal barrier ceramic coating on its front side, the side which faces the hot exhaust flow.

An axial retaining means to prevent the hooks from disengaging from the support structure is also provided. In one embodiment, a lug extends radially outwardly from the back of the baseplate to engage a clevis on the frame. A bolt or other fastening means is disposed through aligned apertures in the lug and the clevis to axially retain the baseplate to the frame.

A principal advantage of the present invention is the ability to readily remove and replace a thermal shield from a support structure while the support structure is still mounted in an engine exhaust nozzle. The removable baseplate and support structure assembly of the present invention also prolongs the service life of the baseplate due to a decrease in temperature induced stresses, since the baseplate is allowed unrestricted thermal growth in the axial and circumferential directions. Additionally, maintenance costs and aircraft down time are substantially reduced by the ability to readily remove and replace a damaged baseplate while the engine is mounted on the aircraft and is of particular benefit in the field.

The floating baseplate design of the present invention permits higher possible operating temperatures than conventional designs and therefore greater nozzle efficiency and engine thrust and power levels. Design simplicity allows the use of higher temperature materials for the baseplate such as ceramic matrix composites or other high temperature resistant non-metallics that are relatively brittle as compared to metal. A weight savings over conventional designs can be realized by the use of high temperature resistant ceramic matrix composites.

BRIEF DESCRIPTION OF THE DRAWINGS

The foregoing aspects and other features and advantages of the invention are explained in the following description, taken in connection with the accompanying drawings where.

DETAILED DESCRIPTION OF THE INVENTION

Figure 1:
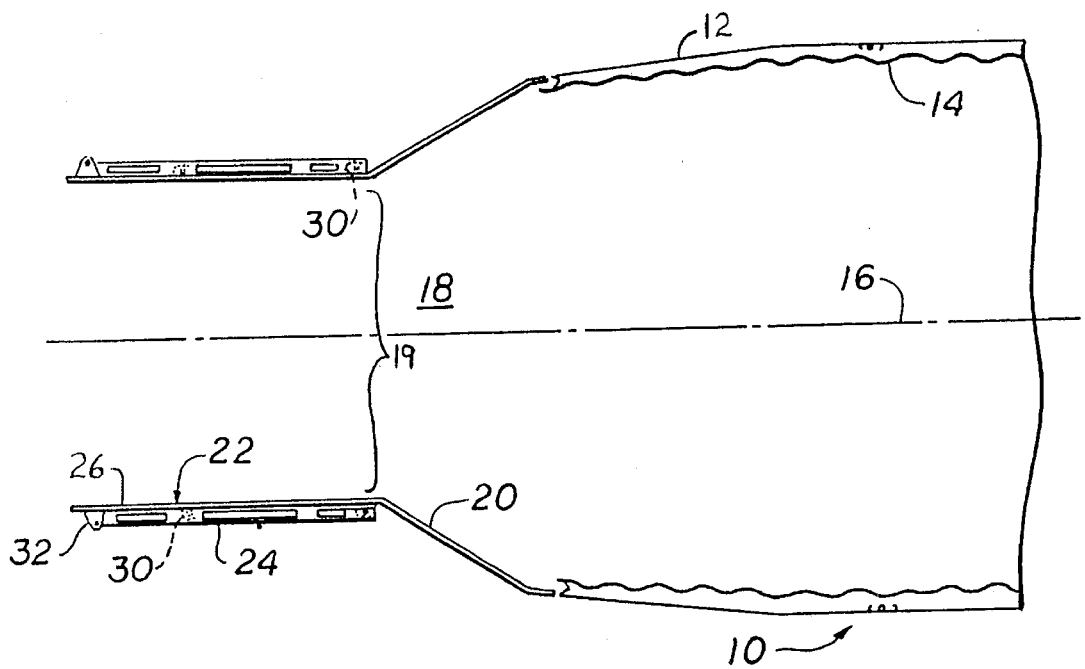
FIG. 1 is a schematic cross-sectional view of a portion of the aft end of an aircraft gas turbine engine with an exhaust nozzle having a removable baseplate and support structure in accordance with the present invention.

The thermal shield and support structure of the present invention is illustrated by a removable baseplate and support structure to which the baseplate is removably mounted in the form of a divergent seal in the exhaust nozzle of a gas turbine engine. The invention is also applicable to but not limited to exhaust nozzle convergent and divergent flaps and convergent seals. For illustration purposes a divergent seal is described with particularity below and in the drawings because of the particular advantages the present invention offers to such a design as described above.

With reference to FIG. 1, there is shown an aft portion of the exhaust section of a gas turbine engine 10 having annular casing 12 circumscribing an engine center-line 16 and an annular afterburner liner 14 radially inward of the casing 12. An axisymmetric convergent/divergent nozzle 18 is disposed at the aft end of the casing 12 aft of the afterburner liner 14 and is of the variable throat and exit area type such as may be found in the AVEN™ nozzle disclosed in the Hauer patent referenced above. Convergent seals 20 are in generally slidable sealing engagement with divergent seals 22 and both seals are operable to pivot with respect to each other about a throat 19 of the nozzle 18. Divergent seals 22 are generally supported by circumferentially adjacent flaps (not shown). A more detailed explanation of the seal mounting may be had by reference to the Hauer patent referenced above and U.S. Pat. No. 5,076,496 to William C. Lippmeier, entitled "Exhaust Nozzle Flap Seal", assigned to the same assignee, and incorporated herein by reference. Each divergent seal 22 includes a longitudinally extending support structure 24 upon which is mounted a removable baseplate 26 which is mounted in a sliding fashion and radially secured by a floating mount means generally shown at 30 and axially secured by an axial retaining means 32.

Figure 2:
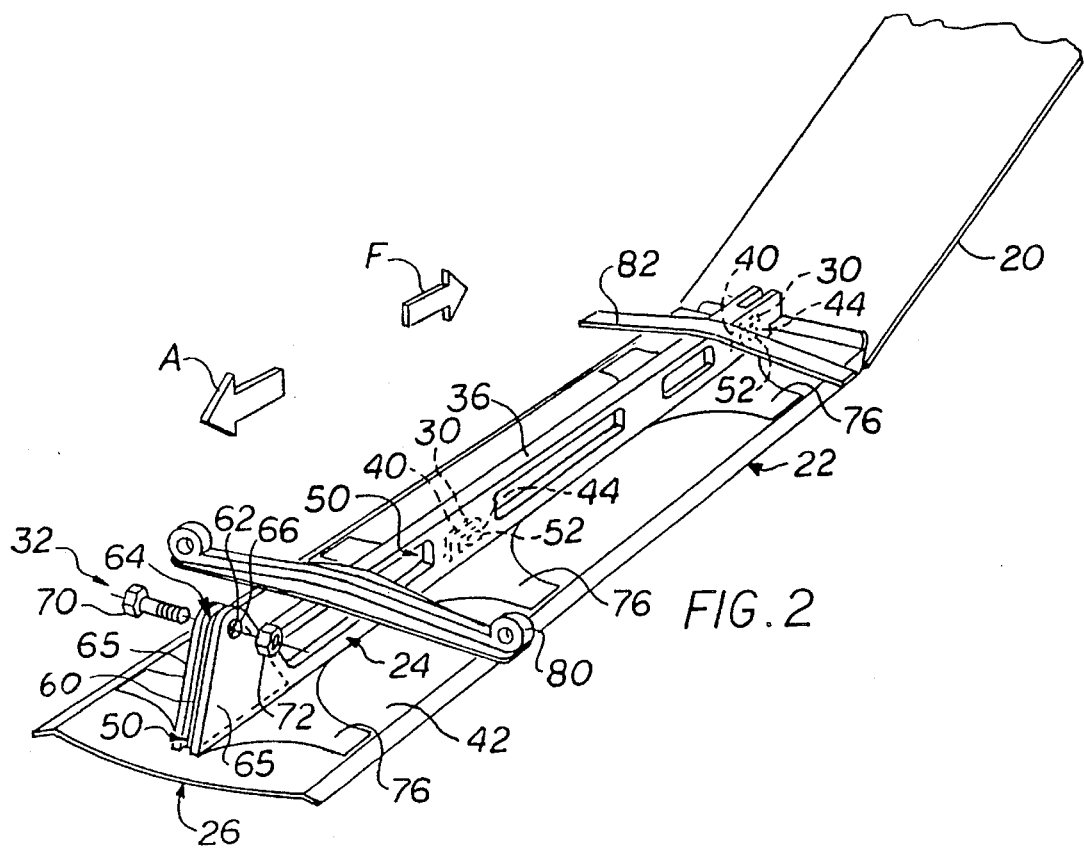
FIG. 2 is a perspective view of a removable baseplate and support structure for a seal depicted in FIG. 1 in accordance with one embodiment of the present invention.
Figure 3:
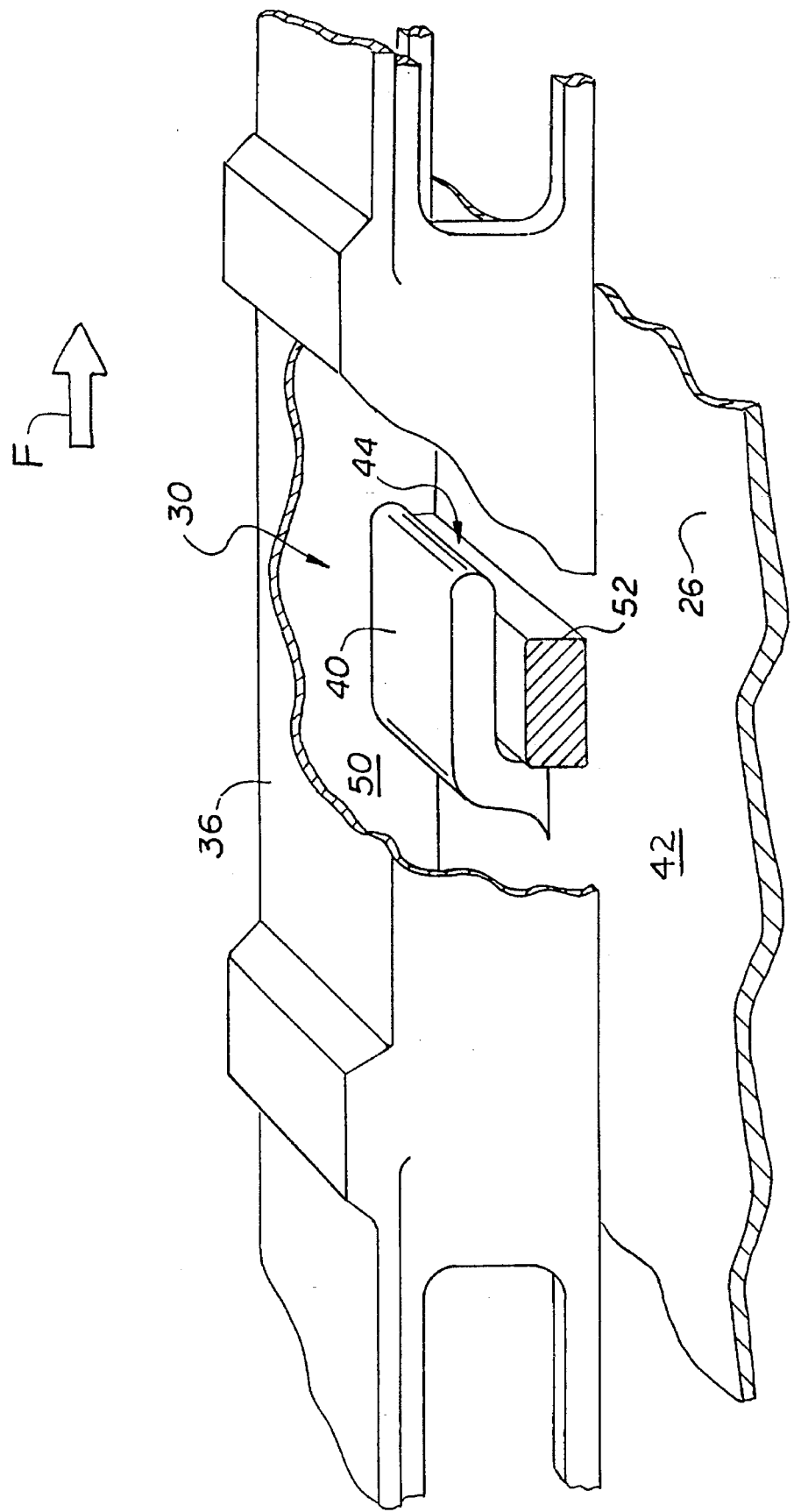
FIG. 3 is a perspective view of a portion of the frame and baseplate depicted in FIG. 1 showing the attachment means in greater detail.

Referring to FIG. 2, divergent seal 22 is more particularly shown in slidable sealing engagement with convergent seal 20. The support structure 24 includes a frame 36 to which is mounted the removable baseplate 26 which is mounted in a sliding fashion and radially secured by the floating mount means 30. The floating mount means 30, illustrated in greater detail in FIG. 3, has hooks 40, preferably two as shown, and is disposed on the back side 42 of the baseplate 26. Hooks 40 have axially facing openings 44, preferably open in a forward facing direction as indicated by the arrow F. The frame 36 has a channel 50 within which hooks 40 are operable to slide until the hooks engage pins 52 that transversely extend across the channel and are attached to the frame. The frame 36, including the pins 52, is preferably a cast one piece article and the pin 52 though shown as rectangular in cross-section may be of other suitable shape, such as cylindrical.

Referring again to FIG. 2, the baseplate 26 is axially secured to the frame 36 by an axial retaining means 32, to prevent the hooks 40 from axially disengaging from the pins 52. The retaining means 32 exemplified herein includes a lug 60 extending radially from the back side 42 of the baseplate 26. Lug 60 has a first aperture 62 and is coextensively disposed in a clevis 64. The clevis 64 has two arms 65 having second apertures 66 that are aligned with the first aperture 62 when the baseplate 26 is in an installed position so as to receive a bolt 70 which is secured by a nut 72.

Baseplate 26 can be made of the same metal as that of the frame assembly, or the baseplate 26 can be made from another metal or a high temperature resistant non-metallic material. For example, a coated or uncoated carbon-carbon or ceramic matrix composite material can be used to fabricate the baseplate. Such materials, which are commercially available, are very resistant to high temperatures. However, they are difficult to form or join and have other limiting characteristics such that they are not suitable for nozzle parts such as the support structure. The two piece nature of the seal and the floating of the baseplate relative to the support structure assembly of the present invention allows each part to be made of a material which best serves that part's performance requirements. A secondary benefit possible with the exhaust flaps of the invention is the latitude to fabricate or coat a removable baseplate with "low observable" material (known materials able to absorb radar waves to avoid detection by radar) and high temperature resistant materials that are somewhat brittle.

Referring to FIG. 2, the preferred embodiment of the invention further comprises a dampening means shown as transversely extending and somewhat radially inwardly directed dampening arms 76 transversely cantilevered from the frame 36. The dampening arms 76 are constructed to maintain radially inwardly directed pressure on the baseplate 26 during engine operation for vibration dampening and flutter control.

The nozzle seals are accessible when positioned in the exhaust nozzle section of a gas turbine engine of an aircraft. Particularly, fastening means, bolt 70 and nut 72, is readily removed. This allows the baseplate 26 to slide in the aft direction, indicated as arrow A, until hooks 40 fully disengaged from the pins 52 of the frame 36 and support structure 24. A replacement baseplate is easily installed by sliding it in the forward direction F with its hooks 40 in the channel 50 until the hooks engage and are secured by the pins 52 and the second apertures 66 of clevis arms 65 are aligned with the first aperture 62 of the lug 60 of the baseplate 26. The aperture alignment provides for a registration means to ensure proper positioning of the baseplate 26 relative to the pins 52, the frame 36, and the dampening arms 76 of the support structure 24. Proper positioning is an important feature for thermal design considerations. The bolt 70 is then inserted through the second and first apertures 66 and 62 respectively and nut 72 is then threaded onto the bolt thereby securing the retaining means 32 in place. The entire disassembly and assembly may be performed with the engine fully in position in the aircraft thereby providing a highly desirable operational function.

Note that the divergent seal 22 is not attached to convergent seals 20 and that support for the seal is provided by conventional hangers that are interconnected to adjacent divergent flaps (not shown) and are illustrated by an aft hanger 80 and a forward hanger 82. AVEN™ nozzles may benefit from a more accommodating type of hanger or retaining means similar in function to the ones disclosed in the Hauer patent referenced above.

The advantages flowing from the above described invention as described with particular reference to the drawings are apparent to those skilled in the art. Baseplates, particularly of seals, in exhaust nozzles receive the greatest temperature exposure and tend to suffer damage before any other part of the flaps and seals. In accord with this invention, any damaged baseplate is readily replaced without having to remove the entire nozzle flap or seal. Rather, the fastening means is removed, the damaged baseplate removed, and a new baseplate installed. There is no need to disengage the various flap and seal linkages and mounting attachments. This means there is a substantial savings in maintenance costs by this time saving feature.

Still further, use of the floating baseplate construction of the invention allows the use of relatively brittle high temperature ceramic and other nonmetallic materials which allow for the use of higher thrust level nozzles and nozzles which operate at higher temperatures and therefore at higher efficiencies. A preferred coated baseplate of ceramic fibers embedded within an oxygen inhibited carbon matrix or ceramic matrix composite material permits even longer service life of the seal simply because of the higher temperature resistance of each of these materials than the normally used metal alloy. Also, the use of such preferred baseplates permits engine growth potential.

The convergent/divergent nozzle seal described in particularity with reference to the drawings represent a preferred embodiment. It will be understood by those skilled in the art that modifications and changes of an obvious nature can be made and that the invention applies to any exhaust component, including convergent and divergent nozzle flaps and convergent and divergent nozzle seals. The appended claims are intended to cover all such modifications and variants.

I claim:

1. A thermal shield and support structure assembly for a gas turbine engine, said assembly comprising:

a longitudinally extending removable thermal shield, a support structure for supporting said thermal shield in the engine comprising a longitudinally extending frame having a longitudinally extending channel through its center, at least two hooks mounted on said thermal shield, said hooks open in a longitudinally facing direction, hook engaging elements transversely mounted, relative to said thermal shield, on said frame transversely across said channel, and said thermal shield and said support structure removably mounted to each other by said hooks being in sliding engagement with said hook engaging elements.

2. An assembly as claimed in claim 1 wherein said support structure further comprises a dampening means for preloading said thermal shield in a radial direction with respect to said support structure to suppress and dampen mechanical vibration and flutter.

3. An assembly as claimed in claim 2 wherein said dampening means comprises transversely extending arms that are biased towards and operable to engage the back side of said thermal shield in bending during engine operation.

4. An assembly as claimed in claim 3 further comprising a thermal shield axial retaining means including a fastening means for connecting said thermal shield to said support structure.

5. An assembly as claimed in claim 4 wherein said axial retaining means further comprises:

a lug having a first aperture and extending up from the back side of said thermal shield through at least two arms of a clevis on said frame, said two arms having second apertures alignable with said first aperture, and said fastening means comprising a bolt disposed through said apertures and secured by a nut.

6. A divergent seal for a gas turbine engine exhaust nozzle, said divergent seal comprising:

a longitudinally extending removable baseplate, a support structure for supporting said baseplate in the exhaust nozzle, said support structure comprising a longitudinally extending frame having a channel through its center;

at least two hooks mounted on generally along an axially extending center portion of a radially outer side of said baseplate, said hooks open in a longitudinally forward facing direction, hook engaging elements mounted on said frame transversely across said channel, said baseplate and said support structure removably mounted to each other by said hooks being in sliding engagement with said hook engaging elements, and a fastener connecting said baseplate to said support structure.

7. A divergent seal as claimed in claim 6 wherein said support structure further comprises:

an axial retaining means including:

a lug having a first aperture and extending up from the radially outer side of said baseplate through at least two arms of a clevis on said frame, said two arms having second apertures alignable with said first aperture, and said fastener comprising a bolt disposed through said apertures and secured by a nut.

8. A divergent seal as claimed in claim 7 wherein said baseplate comprises a metal alloy.

9. A divergent seal as claimed in claim 8 wherein said baseplate further comprises a coating.

10. A divergent seal as claimed in claim 7 wherein said baseplate comprises a non-metallic material.

11. A divergent seal as claimed in claim 10 wherein said baseplate further comprises a coating.

\* \* \* \* \*